(12) United States Patent
Greiner et al.

(10) Patent No.: US 8,516,864 B2
(45) Date of Patent: Aug. 27, 2013

(54) ELECTRONIC LATCH MECHANISM

(75) Inventors: Matthew R. Greiner, Greer, SC (US); Gregg W. Walla, Lake Bluff, IL (US)

(73) Assignee: CompX International Inc., Greenville, SC (US)

( * ) Notice: Subject to any disclaimer, the term of this patent is extended or adjusted under 35 U.S.C. 154(b) by 329 days.

(21) Appl. No.: 12/878,148

(22) Filed: Sep. 9, 2010

(65) Prior Publication Data
US 2011/0056253 A1 Mar. 10, 2011

Related U.S. Application Data

(60) Provisional application No. 61/241,067, filed on Sep. 10, 2009.

(51) Int. Cl.
*E05C 3/06* (2006.01)

(52) U.S. Cl.
USPC .............................. 70/278.7; 70/257; 292/201

(58) Field of Classification Search
USPC .................. 70/201, 202, 255, 256, 257, 275, 70/277, 278.1, 278.6, 278.7; 292/201, 216
See application file for complete search history.

(56) References Cited

U.S. PATENT DOCUMENTS

| | | | |
|---|---|---|---|
| 3,504,511 A | 4/1970 | Allen | |
| 3,666,342 A | 5/1972 | Biesecker | |
| 3,792,391 A | 2/1974 | Ewing | |
| 3,804,441 A | 4/1974 | Kobayashi et al. | |
| 3,917,330 A | 11/1975 | Quantz | |
| 4,017,107 A | 4/1977 | Hanchett | |
| 4,026,589 A | 5/1977 | Hanchett, Jr. | |
| 4,262,830 A | 4/1981 | Haves | |
| 4,268,076 A | 5/1981 | Itoi | |
| 4,390,197 A | 6/1983 | Butts | |
| 4,595,220 A | 6/1986 | Hanchett, Jr. et al. | |
| 4,623,178 A | 11/1986 | Geringer et al. | |
| 4,626,010 A | 12/1986 | Hanchett, Jr. et al. | |
| 4,648,036 A | 3/1987 | Gallant | |
| 4,667,990 A * | 5/1987 | Quantz | ......................... 70/241 |
| 4,667,991 A | 5/1987 | Pèbre | |
| 4,967,577 A | 11/1990 | Gartner et al. | |
| 5,007,261 A | 4/1991 | Quantz | |
| 5,020,345 A | 6/1991 | Gartner et al. | |
| 5,033,282 A | 7/1991 | Gartner et al. | |
| 5,134,870 A | 8/1992 | Uyeda et al. | |
| 5,142,890 A | 9/1992 | Uyeda et al. | |
| 5,307,656 A | 5/1994 | Gartner et al. | |
| 5,474,348 A | 12/1995 | Palmer et al. | |

(Continued)

*Primary Examiner* — Christopher Boswell
(74) *Attorney, Agent, or Firm* — Dority & Manning, P.A.

(57) ABSTRACT

A latch apparatus for providing secure storage to an enclosure is disclosed. The latch apparatus can include an actuating device that operates to lock or unlock the latch apparatus in response to a control signal. The control signal can be communicated to the latch apparatus through an RF or other transmitted signal or through hardwires connecting the latch apparatus to the remote device. The latch apparatus can be maintained in either a locked state or an unlocked state without having to continuously supply power to the latch apparatus. The latch apparatus can include a latch hook that can be detent biased to both the open position and the closed position while the latch apparatus is in either a locked state or an unlocked state. The latch hook can move from the open position to the closed position while the latch apparatus is in a locked state. The latch apparatus can also have a thickness such that the latch apparatus will fit in the gap in which drawer slide hardware for an enclosure is installed.

16 Claims, 5 Drawing Sheets

(56) References Cited

U.S. PATENT DOCUMENTS

| | | | |
|---|---|---|---|
| 5,484,180 A | 1/1996 | Helmar | |
| 5,540,068 A | 7/1996 | Gartner et al. | |
| 5,617,082 A | 4/1997 | Denison et al. | |
| 5,690,373 A | 11/1997 | Luker | |
| 5,806,355 A * | 9/1998 | Lanigan et al. | 70/257 |
| 5,876,073 A | 3/1999 | Geringer et al. | |
| 5,927,772 A | 7/1999 | Antonucci et al. | |
| 5,934,720 A | 8/1999 | Karalius | |
| 6,021,038 A | 2/2000 | Hanchett, Jr. | |
| 6,089,626 A * | 7/2000 | Shoemaker | 292/201 |
| 6,092,846 A | 7/2000 | Fuss et al. | |
| 6,108,188 A | 8/2000 | Denison et al. | |
| 6,125,670 A | 10/2000 | Fuss et al. | |
| 6,359,547 B1 | 3/2002 | Denison et al. | |
| 6,390,520 B1 | 5/2002 | Holzer | |
| 6,730,867 B2 | 5/2004 | Hyp | |
| 6,886,869 B2 * | 5/2005 | Martinez et al. | 292/201 |
| 6,950,944 B2 | 9/2005 | Yager et al. | |
| 7,004,517 B2 | 2/2006 | Vitry et al. | |
| 7,021,684 B2 * | 4/2006 | Orbeta et al. | 292/201 |
| 7,131,673 B2 | 11/2006 | Cherry et al. | |
| 7,296,830 B2 | 11/2007 | Koveal et al. | |
| 7,455,335 B2 | 11/2008 | Garneau et al. | |
| 7,456,725 B2 | 11/2008 | Denison et al. | |
| 7,472,934 B2 | 1/2009 | Burke et al. | |
| 7,482,907 B2 | 1/2009 | Denison et al. | |
| 7,516,632 B2 * | 4/2009 | Poppell | 70/279.1 |
| 7,603,882 B2 * | 10/2009 | Carbajal et al. | 70/267 |
| 7,683,758 B2 | 3/2010 | Denison et al. | |
| 7,728,711 B2 | 6/2010 | Shoenfeld | |
| 7,741,952 B2 | 6/2010 | Denison et al. | |
| 8,047,582 B1 * | 11/2011 | Rodgers et al. | 292/201 |
| 8,104,803 B2 * | 1/2012 | Horton et al. | 292/201 |
| 2004/0032131 A1 | 2/2004 | Cherry | |
| 2005/0199026 A1 | 9/2005 | Geringer et al. | |
| 2005/0225097 A1 | 10/2005 | Geringer et al. | |
| 2006/0097522 A1 | 5/2006 | Denison et al. | |
| 2006/0097525 A1 | 5/2006 | Toma et al. | |
| 2006/0186678 A1 | 8/2006 | Myers et al. | |
| 2007/0018791 A1 | 1/2007 | Johnson et al. | |
| 2007/0046040 A1 | 3/2007 | Chang | |
| 2007/0245784 A1 | 10/2007 | Geringer et al. | |
| 2008/0169657 A1 | 7/2008 | Horton et al. | |
| 2008/0224481 A1 | 9/2008 | Geringer et al. | |
| 2008/0246286 A1 | 10/2008 | Ostrowski | |
| 2008/0252083 A1 | 10/2008 | Carabalona | |
| 2009/0282879 A1 * | 11/2009 | Marcelle et al. | 70/277 |
| 2010/0141381 A1 | 6/2010 | Bliding et al. | |

\* cited by examiner

ELECTRONIC LATCH MECHANISM

PRIORITY CLAIM

This application claims the benefit of previously filed U.S. Provisional Patent Application entitled "ELECTRONIC LATCH MECHANISM," assigned U.S. Ser. No. 61/241,067, filed Sep. 10, 2009, and which is incorporated herein by reference for all purposes.

FIELD OF THE INVENTION

The present subject matter generally relates to latch mechanisms. More specifically, the present subject matter relates to an electronic latch apparatus that may have the capability of being remotely locked and unlocked through an RF or other control signal.

BACKGROUND OF THE INVENTION

Many occasions arise that require the use of latching mechanisms to control access to different types of cabinets, entryway doors, carts, furniture, tool boxes, and other types of boxes, hereafter collectively referred to as enclosures, regardless generally of their compositions, materials, or configurations. Such enclosures may be provided with doors and/or may also include drawers.

Electronic locks with remote lock capabilities have been used to provide secure storage and access control to enclosures. Such electronic locks typically include a solenoid or other actuating device that receives a control signal. Such control signal can be configured to trigger the solenoid or other actuating device to mechanically operate the lock such that the lock is in either a locked state or an unlocked state. The control signal can be sent remotely to the electronic lock through an RF or other transmitted signal or through hardwires connecting the electronic lock to the remote device.

Electronic locks typically require a power supply, such as a battery power supply, to power the actuation of the solenoid or other actuating device and the other various electronic components of the electronic lock, such as the receiver for an RF or otherwise transmitted control signal. Often times such power supplies, such as in the case of battery power supplies, can only provide power to the electronic lock for a limited period of time before failure. Once the power supply fails, the power supply will no longer be able to provide power to the electronic lock, and various components of the electronic lock may cease to operate.

To address the limited power resources of many power supplies, electronic locks often times operate in either of an intentional fail safe or fail secure mode. Electronic locks operating in fail safe mode typically require the solenoid or other actuating device to be energized to maintain the electronic lock in a locked state. When the power supply fails, the solenoid or other actuating device will no longer be energized, resulting in the lock being in the unlocked state during a power supply failure. Thus, access can be provided to the enclosure regardless of the event of a power supply failure.

Electronic locks operating in a fail secure mode typically require the solenoid or other actuating device to be energized to maintain the electronic lock in an unlocked state. When the power supply fails, the solenoid or other actuating device will no longer be energized, resulting in the lock being in a locked state during a power supply failure. In this manner, the electronic lock can provide secure storage to the enclosure regardless of the event of a power supply failure.

Electronic locks having the capability to operate in either a fail safe or fail secure mode usually require a constant supply of power to maintain the lock in either a locked or unlocked state. Moreover, certain electronic locks may require a significant amount of energy to operate the solenoid or other actuating device, resulting in a significant drain on available and often limited power resources. Other electronic locks can be bulky and not desirable for providing secure storage to enclosures such as furniture drawers.

U.S. Patent Application Publication No. 2005/0199026 discloses an interchangeable lock operable in fail safe or fail secure modes.

U.S. Pat. No. 7,472,934 discloses a solenoid operated latching strike that is pivotable between open and closed positions for releasing and retaining, respectively, a latch bolt. A bi-stable detent is displaceable between a stable locking position (at which the detent engages the latching strike to lock the latching strike in the closed position) and a stable unlocking position (at which the detent is disengaged from the latching strike thereby enabling the latching strike to be deflected to the open position by the latch bolt).

U.S. Pat. Nos. 6,730,867; 5,927,772; and 3,804,441 also variously relate to examples of known latching mechanisms.

The forgoing patent related publications are hereby incorporated by reference herein for all purposes.

While various implementations of latching mechanisms have been developed, no design has emerged that generally encompasses all of the desired characteristics as hereafter presented in accordance with the subject technology.

SUMMARY OF THE INVENTION

In view of the recognized features encountered in the prior art and addressed by the present subject matter, an improved apparatus is presently disclosed for providing secure storage to enclosures.

In one exemplary configuration, a latch apparatus can be maintained in either a locked state or an unlocked state without having to continuously supply power to the latch apparatus.

In accordance with certain aspects of certain embodiments of the present disclosure, a latch apparatus can include a latch hook that can be maintained in an open position or a closed position while the latch apparatus is in either a locked state or an unlocked state. The latch hook can move from the open position to the closed position while the latch apparatus is in a locked state.

In accordance with yet additional aspects of certain embodiments of the present disclosure, the latch-hook bolt can be detent biased to both the open position and the closed position.

In accordance with yet additional aspects of certain embodiments of the present disclosure, the latch apparatus can include an actuating device that operates to lock or unlock the latch apparatus in response to a control signal. The control signal can be communicated to the latch apparatus through an RF or otherwise transmitted signal or through hardwires connecting the latch apparatus to the remote device.

In accordance with yet additional aspects of certain embodiments of the present disclosure, the actuating device can be detent biased to both a locked position and an unlocked position such that electrical power is not required to maintain the latch mechanism in a locked state or an unlocked state.

In accordance with yet additional aspects of certain embodiments of the present disclosure, the latch apparatus may be configured so as to have a relatively minimized thickness such that it will fit in the gap in which drawer slide hardware for an enclosure is installed.

In accordance with yet additional aspects of certain embodiments of the present disclosure, the latch apparatus is designed such that it can provide secure access to both linear enclosure drawer arrangements and arching enclosure door arrangements.

For example, one embodiment of the present disclosure may be directed to an apparatus for providing secure access to an enclosure. The apparatus may include an actuating device, such as a solenoid, having a locked position and an unlocked position. The apparatus may further include a lever catch operably connected to the actuating device and a latch hook having an open position and a closed position. The lever catch may prevent the latch hook from moving to the open position when the solenoid is in the locked position and the latch hook is in the closed position.

Those of ordinary skill in the art will understand from the full disclosure herewith that the present subject matter equally and variously relates to both apparatus and corresponding and/or related methodology. One present exemplary embodiment relates to a latch apparatus for cooperating with a strike to provide secure storage to an enclosure associated therewith. Such a present exemplary latch apparatus may preferably include an actuating device for selectively placing such latch apparatus in either of a locked state and an unlocked state thereof in response to a control signal; a latch hook movable between respective open and closed positions thereof relative to an associated strike; bi-stable latch hook detent biasing means for biasing such latch hook to either of such open position and such closed position thereof while such latch apparatus is in either of such locked state and such unlocked state thereof; and a biased actuating device catch, associated with such actuating device and interoperative with such latch hook, so that such latch hook is movable from such open position thereof to such closed position thereof while such latch apparatus is in either one of its locked and unlocked states.

In some variations of such present exemplary embodiments, such exemplary actuating device may comprise an electrically operated solenoid; and such exemplary latch apparatus may further include bi-stable solenoid biasing means associated with such solenoid so that such latch apparatus can be maintained in either of such locked state and such unlocked state thereof without having to continuously supply power to such latch apparatus. In other present such variations, such exemplary present solenoid may include a bi-position movable plunger which moves to an opposite position thereof when such solenoid is actuated; and such bi-stable solenoid biasing means may include a spring for biasing such solenoid plunger to such unlocked state of such latch apparatus, and include a magnet for biasing such solenoid plunger to such locked state of such latch apparatus.

In other present variations, such latch apparatus may include a receiver for receiving such control signal from an associated user-controlled remote control signal device.

In still further present variations, such exemplary latch apparatus may further include an RF receiver for receiving such control signal from an associated user-controlled RF remote control signal device; and a battery-operated power supply for powering such electrically operated solenoid and for powering such RF receiver. In some such variations, such latch apparatus may still further include a relatively flat profile housing for receipt of such latch apparatus in a drawer of an associated enclosure, with such housing having a removable section for receipt of such battery-operated power supply to facilitate changing of batteries of such power supply. In further present such variations, such remote control signal device may include keypad means for input of an access code thereto transmitted with such control signal; and such latch apparatus may further include circuitry associated with such RF receiver for decoding such access code to decide whether to send such control signal to such actuating device.

Per further present alternative present exemplary latch apparatus, such actuating device may comprise an electrically operated solenoid; and such latch apparatus may further include hardwired connections therewith, for receiving such control signal from a user-controlled source whereby access to an associated enclosure is controlled by a user, and for transfer of electrical power to such electrically operated solenoid. In alternatives thereto, such latch apparatus may further include a housing for receipt of such latch apparatus in an associated enclosure; and a circuit board received in such housing, such circuit board providing such RF receiver and providing a processor for controlling operation of such electrically operated solenoid in response to such control signal. In some such instances, an associated user-controlled RF remote control signal device may transmit encoded control signal data, and such processor may include a database of access codes for processing such encoded control signal data.

Yet further present latch apparatus may alternatively further include a housing for receipt of such latch apparatus in an associated enclosure; and such bi-stable latch hook detent biasing means may comprise a latch hook detent spring pivotably associated with such latch hook and having a center coil received in a curved guide formed by such housing, for providing bi-stable functionality of such bi-stable latch hook detent biasing means by movement of such spring center coil in such curved guide.

Another present exemplary embodiment in accordance with the present subject matter relates to a battery-operated energy conserving electronic latch system for providing secure storage to an associated enclosure. Such a system preferably includes a strike associated with an enclosure to be secured; an electrically operated solenoid for selectively placing such latch system in either of a locked state and an unlocked state thereof in response to a control signal; a latch hook movable between respective open and closed positions thereof relative to an associated strike; bi-stable latch hook detent biasing means for biasing such latch hook to either of such open position and such closed position thereof while such latch system is in either of such locked state and such unlocked state thereof; a biased actuating device catch, associated with such solenoid and interoperative with such latch hook, so that such latch hook is movable from such open position thereof to such closed position thereof while such latch system is in either one of its locked and unlocked states; an associated user-controlled remote control signal device for selectively transmitting such control signal; a receiver for receiving such control signal; a battery-operated power supply for powering such electrically operated solenoid and for powering such receiver; and bi-stable solenoid biasing means associated with such solenoid so that such latch system can be maintained in either of such locked state and such unlocked state thereof without having to continuously supply power to such solenoid.

In such present systems, such solenoid may optionally further include a bi-position movable plunger which moves to an opposite position thereof when such solenoid is actuated; and such bi-stable solenoid biasing means may include a spring for biasing such solenoid plunger to such unlocked state of such latch system, and may include a magnet for biasing such solenoid plunger to such locked state of such latch system. In other present alternatives, such latch system may further include a housing for receipt of such solenoid, such latch hook, such bi-stable latch hook detent biasing means, such biased actuating device catch, such receiver, and such bi-stable solenoid biasing means. Additionally, such battery-operated power supply may be removably attached to such housing.

In still further present alternatives, such housing may have a relatively flat profile for receipt thereof in a drawer of an associated enclosure; such remote control signal device may comprise an RF transmitter with keypad means for user input of an access code thereto transmitted with such control signal; such receiver may comprise an RF receiver; and such latch system further may further include a circuit board received in such housing, such circuit board providing such RF receiver and providing a processor associated with such RF receiver for decoding such access code to decide whether to send such control signal to such electrically operated solenoid.

Per other present alternatives for some embodiments, such bi-stable latch hook detent biasing means may comprise a latch hook detent spring pivotably associated with such latch hook and having a center coil received in a curved guide formed by such housing, for providing bi-stable functionality of such bi-stable latch hook detent biasing means by movement of such spring center coil in such curved guide.

Other present exemplary embodiments equally relate to methodology for a battery-operated energy conserving electronic latch apparatus for cooperating with a strike to provide secure storage to an associated enclosure. A present exemplary such method relates to providing an electrically operated solenoid for selectively placing the latch apparatus in either of a locked state and an unlocked state thereof in response to a control signal; providing a latch hook movable by a user between respective open and closed positions thereof relative to an associated strike; biasing such latch hook so that it is only in either of its open position or its closed position regardless of whether the latch apparatus is in either its locked state or unlocked state; providing a catch associated with the solenoid and interoperative with the latch hook such that the latch hook is movable from its open position to its closed position regardless of whether the latch apparatus is in its locked or unlocked state; providing a battery-operated power supply associated with the latch apparatus for powering the electrically operated solenoid; and biasing the solenoid into either of the locked or unlocked state once such state is electrically selected by a control signal. In such fashion, advantageously the latch apparatus can be maintained in either its locked state or its unlocked state without having to continuously supply power to the solenoid.

Per an alternative additional aspect of some present methods, a receiver may be provided, associated with the latch apparatus and powered by the battery-operated power supply, for receiving a control signal; and a control signal may be selectively transmitted to such receiver for placing the latch apparatus in either such locked or unlocked state.

In other present variations, the step of biasing the solenoid into either of the locked or unlocked state may include differential biasing so that relatively more electrical energy is required to actuate the solenoid from the unlocked state to locked state, than is required to actuate the solenoid from the locked state to the unlocked state, so that preferentially, available power resources from the battery-operated power supply required to place the latch apparatus in a locked state will fail before failure of such available power resources to place latch apparatus in an unlocked state. Such methodology advantageously prevents loss of power to such latch apparatus while such latch apparatus is in its locked state.

In some present methods, the latch apparatus may be provided in a relatively flat profile housing received in a drawer of an associated enclosure.

Various additions or modifications can be made to such exemplary embodiment of the disclosure. For instance, the apparatus can further include a detent configured to bias the latch hook to both the open position and the closed position. In another variation of such exemplary embodiment, the solenoid can include a detent that biases the solenoid to both the locked position and the unlocked position.

Additional aspects and advantages of the present subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures).

Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1:
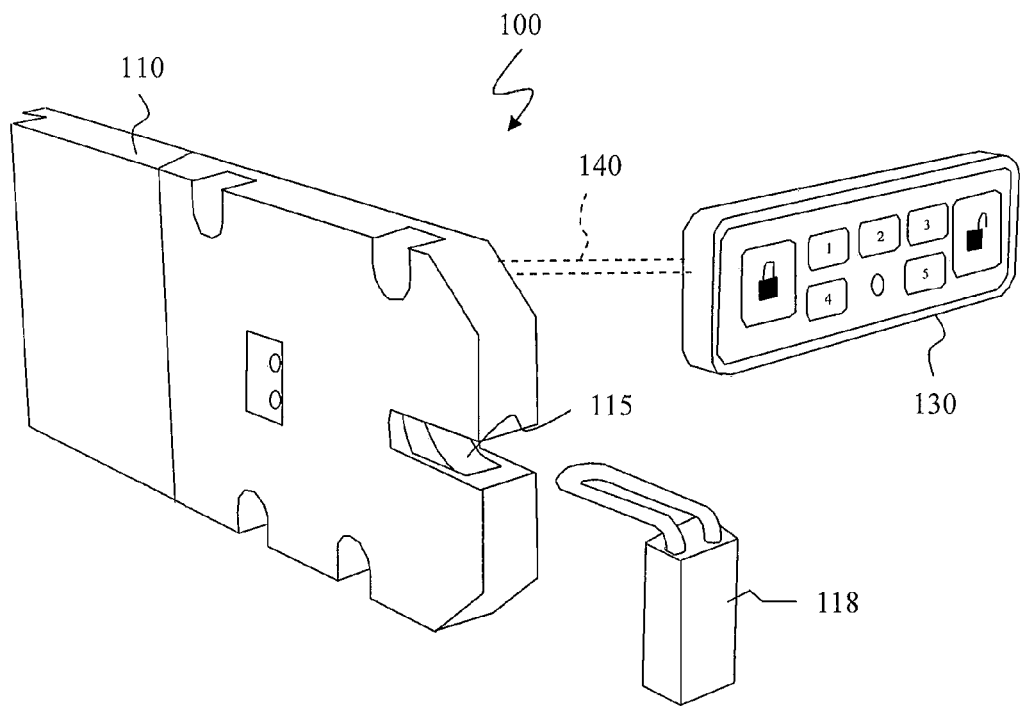
FIG. 1 depicts a perspective view of an exemplary latch system according to one embodiment of the present disclosure.

Repeat use of reference characters throughout the present specification and appended drawings is intended to represent same or analogous features, elements, or steps of the present subject matter.

DETAILED DESCRIPTION OF THE PREFERRED EMBODIMENTS

As discussed in the Summary of the Invention section, the present subject matter is concerned with a latch apparatus.

Selected combinations of aspects of the disclosed technology correspond to a plurality of different embodiments of the present disclosure. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Generally, the present subject matter is directed to a latch apparatus that can be used to provide secure storage to an enclosure. The latch apparatus may be configured to be operated remotely from a control pad or other remote device. For instance, the latch apparatus may be configured to receive an RF or other transmitted control signal from a remote control pad. The control signal may trigger the latch apparatus to lock or unlock as desired. The latch apparatus can also be hardwired directly to the remote control pad such that the control signals are sent through hard wires. Of course, the latch apparatus may also be operated through controls located directly on the latch apparatus.

The latch apparatus can include a latch hook that is configured to engage a strike in order to provide secure storage for an enclosure. The latch hook can be maintained in an open position or a closed position while the latch apparatus is in either a locked state or an unlocked state. The latch hook can also have the capability to move from the open position to the closed position while the latch apparatus is in a locked state.

The latch apparatus may be configured to be maintained in either a locked state or an unlocked state without having to continuously supply power to the latch apparatus. For instance, the latch apparatus may include an actuating device, such as a solenoid, that includes a locked position and an unlocked position. The latch apparatus may include a detent that, depending on the state of the device, biases the actuating device to both (i.e., either of) the locked position and the unlocked position such that a continuous supply of power is not necessary to maintain the actuating device in either the locked position or an unlocked position. In such manner, the latch apparatus of the present disclosure can conserve limited power supply resources, such as from a battery power supply.

The subject latch apparatus may also have a size and configuration such that it can be adapted to secure drawers for various types of furniture, such as desk drawers. For example, in one exemplary embodiment the latch apparatus can have a size such that it will fit in the gap in which drawer slide hardware for an enclosure is installed.

FIG. 1 depicts an exemplary latch system 100 according to one exemplary embodiment of the present subject matter. Latch system generally 100 preferably includes a latch apparatus 110, a strike 118, and a control signal device 130. Control signal device 130 preferably may comprise a remote device 130 that can send a control signal, such as an RF signal or other suitable communication signal, to latch apparatus 110. In certain embodiments, remote device 130 can send control signal to latch apparatus through hard wires 140.

Latch apparatus 110 includes a latch hook 115 adapted to engage strike 118. Latch apparatus 110 can be operated in both a locked state and an unlocked state. When latch apparatus 110 is in a locked state, latch hook 115 cannot be disengaged from strike 118 without use of excessive external force. When latch apparatus 110 is in an unlocked state, latch hook 115 can freely engage and disengage strike 118.

Remote device 130 is used to control whether latch apparatus 110 is operated in a locked state or an unlocked state. As representatively illustrated, remote device 130 includes a 5-key keypad as well as a lock button and an unlock button. Collectively, such keys, keypad, and/or buttons may be regarded as keypad means, such as for input of an access code or other input to device 130, to be transmitted with a control signal. As will be discussed in detail below, a control signal can be received by latch apparatus 110 through a receiver. The receiver may communicate the control signal to an actuating device such as a solenoid. In response to the control signal, the actuating device can move back and forth between a locked position and unlocked position, placing latching mechanism 110 into either a locked state or an unlocked state, respectively.

Figure 2:
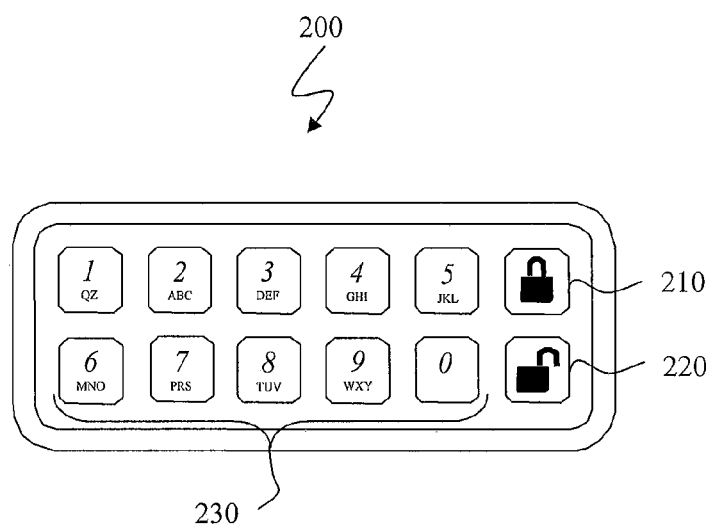
FIG. 2 depicts an exemplary remote control for an exemplary latch system according to one embodiment of the present disclosure.

FIG. 2 depicts an exemplary embodiment of a remote device generally 200 that can be used in accordance with the present technology. Exemplary remote device 200 differs from exemplary remote device 130 depicted in FIG. 1 in that remote device 200 includes a 10-key keypad 230 as well as a lock button 210 and an unlock button 220. A user can send a control signal to a latch apparatus switching the latch apparatus from a locked state to an unlocked state by simply pressing lock button 210. Similarly, a user can send a control signal to a latch apparatus switching the latch apparatus from an unlocked to a locked state by simply pressing unlock button 220. The user may or may not be required to enter an access code, such as a PIN number, by using keypad 230 before the user can lock or unlock the latch apparatus using lock button 210 or unlock button 220.

Those of ordinary skill in the art, using the disclosures provided herein, will readily understand that any remote device capable of sending a control signal to a latch apparatus can be used in accordance with the present technology, wherefore additional details thereof are not required for a complete understanding of the present subject matter. Similarly, those of ordinary skill in the art, using the disclosures provided herein, will also appreciate that a latch apparatus can be operated in accordance with embodiments of the present technology without interfacing with any remote device. For instance, a latch apparatus may include controls located directly on the latch apparatus that can switch the latch apparatus from a locked state to an unlocked state and vice versa.

Figure 3:
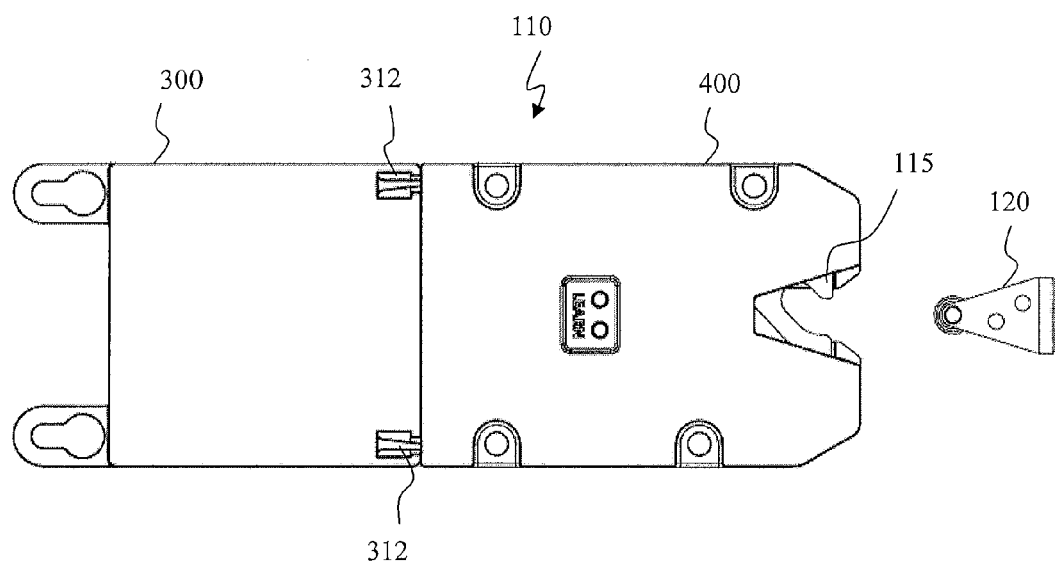
FIG. 3 depicts a front plan view of an exemplary latch apparatus and strike according to one exemplary embodiment of the present disclosure.
Figure 4:
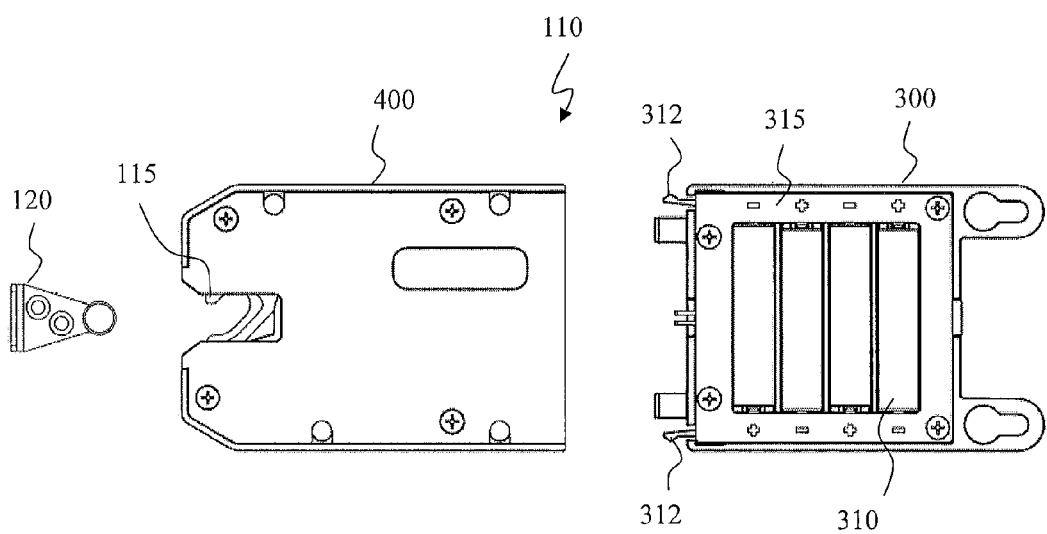
FIG. 4 depicts a back plan view of an exemplary latch apparatus and strike according to one exemplary embodiment of the present disclosure.

With reference to FIGS. 3 and 4, various aspects of an exemplary latch apparatus 110 are discussed in detail. As illustrated, exemplary latch apparatus 110 can include a power supply 300 and latch housing generally 400. Latch housing 400 includes a latch hook 115 that is configured to engage a strike 120. Those of ordinary skill in the art will note that the particular configuration of a strike may vary, with the specific arrangement of present exemplary strike 118 differing from that of exemplary strike 120. Also, other features may be practiced. For example, strike 120 may be provided with a shear ring associated with the post of such strike 120 (such as represented by dotted line element 122 of present FIG. 5) to provide a breakaway feature that creates a known breaking point should the lock be pried with force to such breaking point. Such feature avoids harm to the remainder of the subject mechanism, and all such variations to present features are intended as being encompassed by the broader aspects of the present disclosure. Latch housing 400 can be mounted to a first portion of an enclosure while strike 120 can be mounted to a second portion of an enclosure. The first portion of the enclosure can be secured to the second portion of the enclosure by engaging latch hook 115 with strike 120. Latch apparatus 110 can then be placed in a locked state to provide secure storage in the enclosure.

Power supply 300 can be any device configured to provide electrical power to latch apparatus 110, details of which form no particular aspect of the present subject matter. For instance, as illustrated in FIG. 4, power supply 300 can be a battery power supply source. Such a battery power supply source 300 can include a plurality of batteries 310 that are daisy-chained together or otherwise suitably connected together to provide adequate/sufficient electrical power to latch mechanism 110. Power supply 300 may include back plate 315 to provide structural support for plurality of batteries 310. Back plate 315 can include designations indicating the configuration of the positive and negative terminals of plurality of batteries 315. In other embodiments, the power supply may simply be a hardwire connection to a more permanent power source, such as a wall electrical outlet.

Power supply 300 can be configured to be removably connected to latch housing 400. For instance, as shown in FIG. 3, power supply 300 and latch housing 400 are representatively shown as being connected to each other. However, in FIG. 4, power supply 300 and latch housing 400 are representatively shown as being separated from each other. In such manner, a variety of different power supplies 300 can be used with a single latch housing 400. Such feature can be advantageous for several reasons. For instance, when a first power supply fails, the failed power supply may be removed from latch housing 400 so that a new (operative) replacement power supply can be connected to latch housing 400.

Power supply 300 may variously be removably connected to latch housing 400, for example, through the use of engagement clips 312. Engagement clips 312 can be received into a corresponding slot on latch housing 400 to secure power supply 300 to latch housing 400. Power supply 300 may also include various electrical connections to provide electrical power between power supply 300 and latch housing 400.

Figure 5:
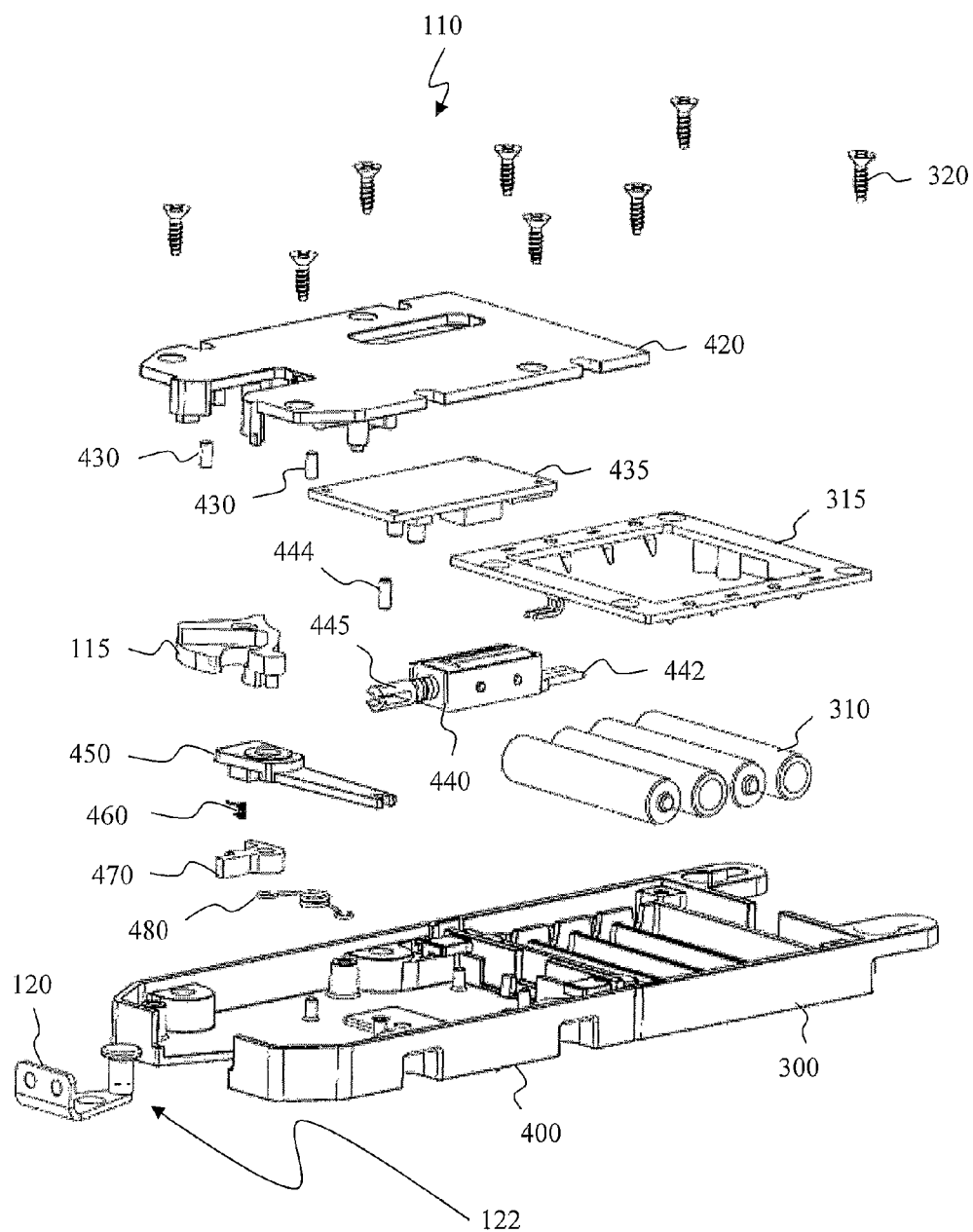
FIG. 5 depicts an exploded perspective view of an exemplary latch apparatus and strike according to one exemplary embodiment of the present disclosure.
Figure 6:
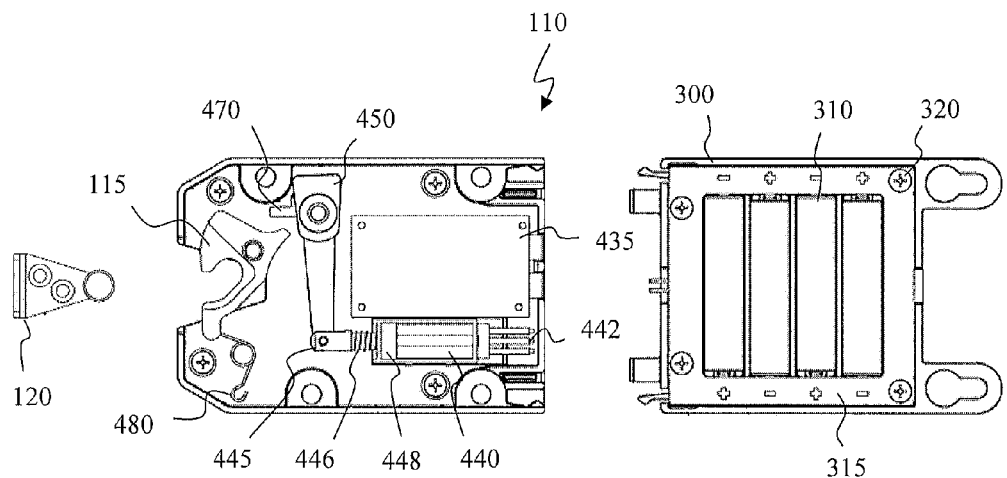
FIG. 6 depicts a plan view of various interior components of an exemplary latch apparatus according to one exemplary embodiment of the present disclosure.

With reference to FIGS. 5 and 6, various exemplary internal components of latch apparatus 110 are discussed in detail. As previously discussed, latch apparatus 110 includes power supply 300 and latch housing 400. Latch housing 400 includes a back plate 420 that is used to provide structural support and to shield various internal components of latch housing 400. Back plate 420 can be secured to latch housing 400 using a plurality of screws 320 or other suitable connecting devices.

As illustrated, latch housing 400 can include a plurality of latch hook stop cushions 430. Latch hook stop cushions 430 serve to provide a stop for rotation of latch hook 115 such that when latch hook 115 is in an open position, latch hook 115 is adjacent to latch hook stop cushions 430.

Latch housing 400 can further include a circuit board 435. Circuit board 435 contains the various electronic components of latch apparatus 400 that allow for the operation of latch apparatus 400. For instance, circuit board 435 can include a receiver for receiving a control signal from a remote device. Circuit board 435 can also include a processor for controlling the operation of an actuating device in response to the control signal. The processor, for instance, may be operatively connected to a database of access codes. The processor may compare an access code entered on a remote device to the access codes stored in the database. The processor can send a signal to an actuating device, such as solenoid 440, if the access code matches an access code stored in the database. Circuit board 435 can also include a control signal bus for communicating control signals to solenoid 440 through control wires 442, as will be discussed in more detail below. Those of ordinary skill in the art, using the disclosures provided herein, should understand that the configuration of circuit board 430 is not limited to any particular hardware architecture or configuration, wherefore details of same form no particular aspects of the present subject matter. Embodiments of the systems and methods set forth herein may be implemented by one or more general-purpose or customized computing devices adapted in any suitable manner to provide desired functionality.

Latch housing 400 includes an actuating device in the form of solenoid 440. Solenoid 440 is used to operate latch apparatus 110 in either a locked state or an unlocked state. Solenoid 440 includes a solenoid plunger 445. Solenoid plunger 445 is movable between two positions, a retracted and locked position, and an extended and unlocked position. Solenoid plunger 445 is movable in response to a control signal received through control wires 442. If an unlock control signal is sent through control wires 442, solenoid 440 actuates solenoid plunger 445 to extend to the unlocked position. If a lock control signal is sent through control wires 442, solenoid 440 actuates solenoid plunger 445 to retract to the locked position. The distance between the locked position and the unlocked position can be very small, such as about 2 mm, such that desirably less energy is required per the present subject matter to move solenoid plunger 445 from the locked position to the unlocked position.

Solenoid 440 includes a detent that biases the solenoid plunger 445 to the locked position and a detent that biases the solenoid plunger 445 to the unlocked position. In this manner, solenoid plunger 445 can be detent biased to both the locked position and the unlocked position. In FIGS. 5 and 6, solenoid 440 includes a spring 446 to bias the solenoid plunger 445 to the unlocked position. Solenoid 440 also includes a magnet 448 that biases solenoid plunger to the locked position.

Because solenoid plunger 445 is detent biased to both the locked position and the unlocked position, no electrical power is required to maintain the solenoid plunger 445 in either the locked position or the unlocked position thereof. For instance, after solenoid 440 has actuated solenoid plunger 445 to extend to the unlocked position, spring 446 maintains solenoid plunger 445 in the extended and unlocked position. After solenoid 440 has retracted solenoid plunger 445 to retract to the locked position, magnet 448 maintains solenoid plunger 445 in the retracted and locked position. In other terminology, spring 446, magnet 448, and their associated features and related functionality thereof may also be viewed as comprising bi-stable solenoid biasing means associated with the solenoid so that the latch apparatus can be maintained in either of the locked state or the unlocked state thereof without having to continuously supply power to the latch apparatus. In other words, such bi-stable solenoid biasing means includes the spring 446 for biasing the solenoid plunger 445 to the unlocked state of the latch apparatus, and includes the magnet 448 for biasing the solenoid plunger 445 to the locked state of the latch apparatus. Therefore, per the present subject matter, no electrical energy is required to maintain solenoid plunger 445 in either such locked position or such unlocked position.

In certain embodiments, it may be arranged to desirably require more electrical energy to overcome the bias force of spring 446 to actuate solenoid plunger 445 from an unlocked position to a locked position than to overcome the bias force of magnet 448 to actuate solenoid plunger 445 from a locked position to an unlocked position. In such manner, the available power resources to place latch apparatus 110 in a locked state will fail prior to the available power resources to place latch apparatus in an unlocked state. In such manner, power failures can be preferentially avoided from occurring while latch apparatus 110 is in the locked state.

Solenoid plunger 445 is operably connected to a first end of solenoid lever 450 through, for example, solenoid plunger pin 444. Solenoid lever 450 is movable between a locked position and an unlocked position in response to the actuation of solenoid plunger 445. Solenoid lever catch 470 is operably connected to solenoid lever 450 at an opposing, second end of solenoid lever 450. Solenoid lever catch 470 is also movable between a locked position and an unlocked position depending on the position of the solenoid plunger 445 and solenoid lever 450.

For instance, when solenoid plunger 445 is in the extended and unlocked position, solenoid lever 450 and solenoid lever catch 470 are tilted slightly backward to an unlocked position. In the unlocked position, solenoid lever catch 470 will not impede the movement of latch hook 115. Accordingly, when solenoid plunger 445, solenoid lever 450, and solenoid lever catch 470 are in the unlocked position, latch hook 115 is freely movable between an open position and a closed position. Latch apparatus 110 is in an unlocked state and can freely engage and disengage strike 120.

When solenoid plunger 445 is in the retracted and locked position, solenoid lever 450 and solenoid lever catch 470 are tilted slightly forward to a locked position. In the locked position, solenoid lever catch 470 will prevent latch hook 115 from moving from a closed position to an open position. This places latch apparatus 110 in a locked state such that latch apparatus can provide secure storage to an enclosure.

Solenoid lever catch 470 is rotatable about an axis intersecting with the second and opposing end of solenoid lever 450. This allows latch hook 115 to move from an open position to a closed position while the solenoid plunger 445, solenoid lever 450, and solenoid lever catch 470 are in the locked position. While latch hook 115 is rotating from the open position to the closed position, the latch hook 115 will force lever catch 470 in a counterclockwise direction to allow latch hook 115 to freely pass lever catch 470 without preventing movement of latch hook 115. After latch hook 115 has reached the closed position, a lever catch spring 460 forces the solenoid lever catch 470 back to its original position such that solenoid lever catch 470 can prevent the movement of latch hook 115 from a closed position to an open position while latch apparatus 110 is in a locked state.

Latch housing 400 further includes a detent spring 480. Detent spring 480 is used to detent bias the latch hook mechanism 115 to either the open position or the closed position, but nowhere in between. The operation of detent spring 480 will be discussed in detail below with reference to FIGS. 7, 8, and 9.

Figure 7:
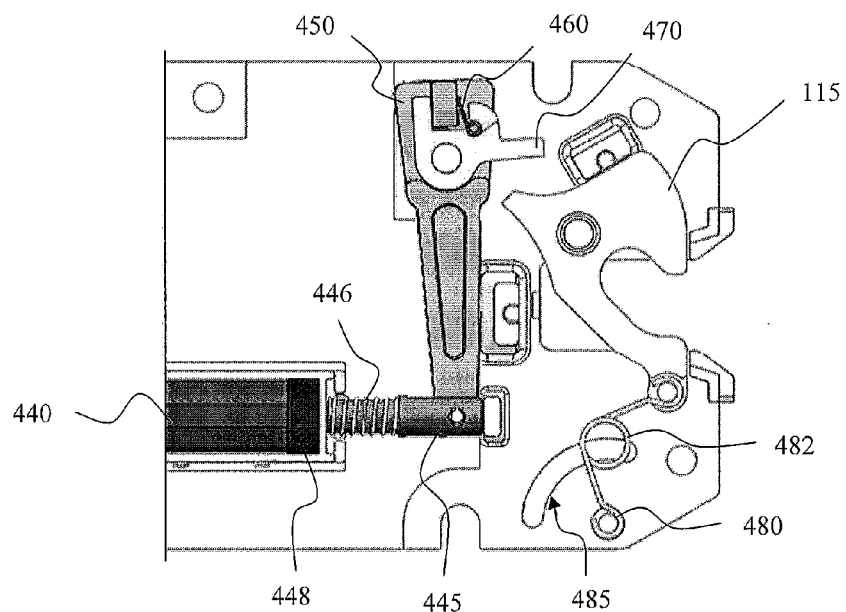
FIG. 7 depicts a plan view of an exemplary latch apparatus in which the latch hook is in the open position and the solenoid is in the unlocked position according to one exemplary embodiment of the present disclosure.

FIG. 7 illustrates latch apparatus 110 with latch hook 115 in an open position and solenoid plunger 445, solenoid lever 450, and solenoid lever catch 470 in the unlocked position. Spring 446 detent biases solenoid plunger 445 to the extended and unlocked position such that no electrical power is required to maintain solenoid plunger 445, solenoid lever 450, and solenoid lever catch 470 in the unlocked position. As illustrated, solenoid lever catch 470 will not impede the movement of latch hook 115. Detent spring 480 detent biases latch hook 115 to the open position. As illustrated, detent spring includes a center coil 482. Center coil 482 is movable along raised guide or support 485 between an open position and a closed position. When center coil 482 of detent spring 480 is in the open position of guide 485, detent spring 480 biases latch hook 115 to the open position. It will be understood from the complete disclosure herewith that detent spring 480 and associated features and related functionality thereof may also be viewed as comprising bi-stable latch hook detent biasing means for biasing the present latch hook generally 115 to either of the open position or the closed position thereof while the present latch apparatus is in either of its locked state or its unlocked state.

Figure 8:
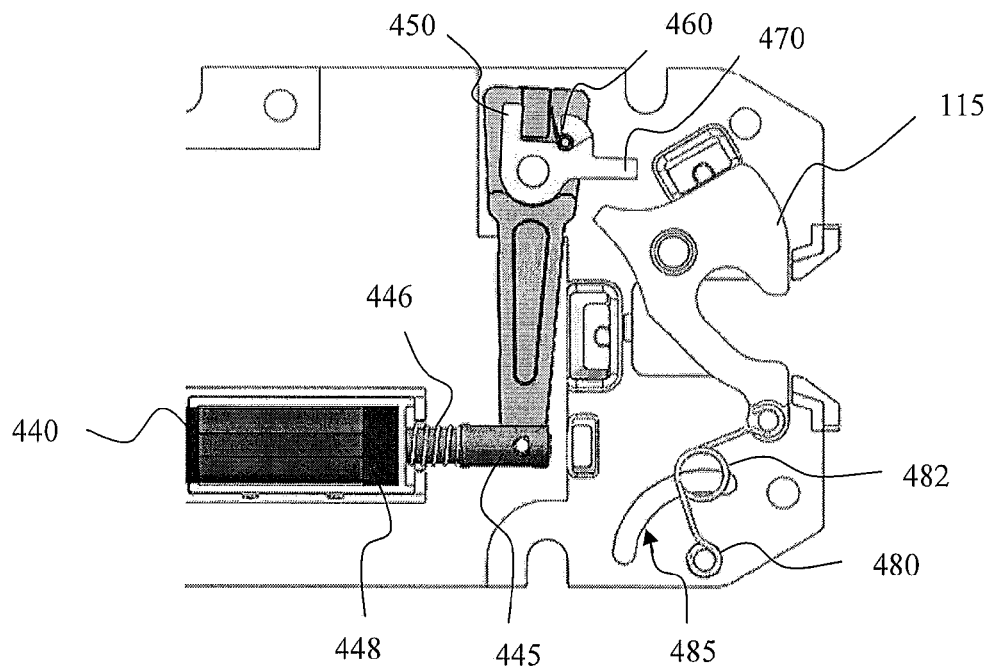
FIG. 8 depicts a plan view of an exemplary latch apparatus in which the latch hook is in the open position and the solenoid is in the locked position according to one exemplary embodiment of the present disclosure.

FIG. 8 illustrates latch apparatus 110 with latch hook 115 in an open position and solenoid plunger 445, solenoid lever 450, and solenoid lever catch 470 in the locked position. Magnet 448 detent biases solenoid plunger 445 to the retracted and locked position such that no electrical power is required to maintain solenoid plunger 445, solenoid lever 450, and solenoid lever catch 470 in the locked position.

Solenoid lever catch 470 is now in a position in which it can impede movement of latch hook 115 from a closed position to an open position. Solenoid lever catch 470 will not, however, impede movement of latch hook from the open position depicted in FIG. 8 to the closed position depicted in FIG. 9. This is because solenoid lever catch 470 is rotatable as discussed above and will allow latch hook 115 to move from an open position to a closed position. Center coil 482 of detent spring 480 remains in open position of guide 485 and continues to bias latch hook 115 to the open position.

Figure 9:
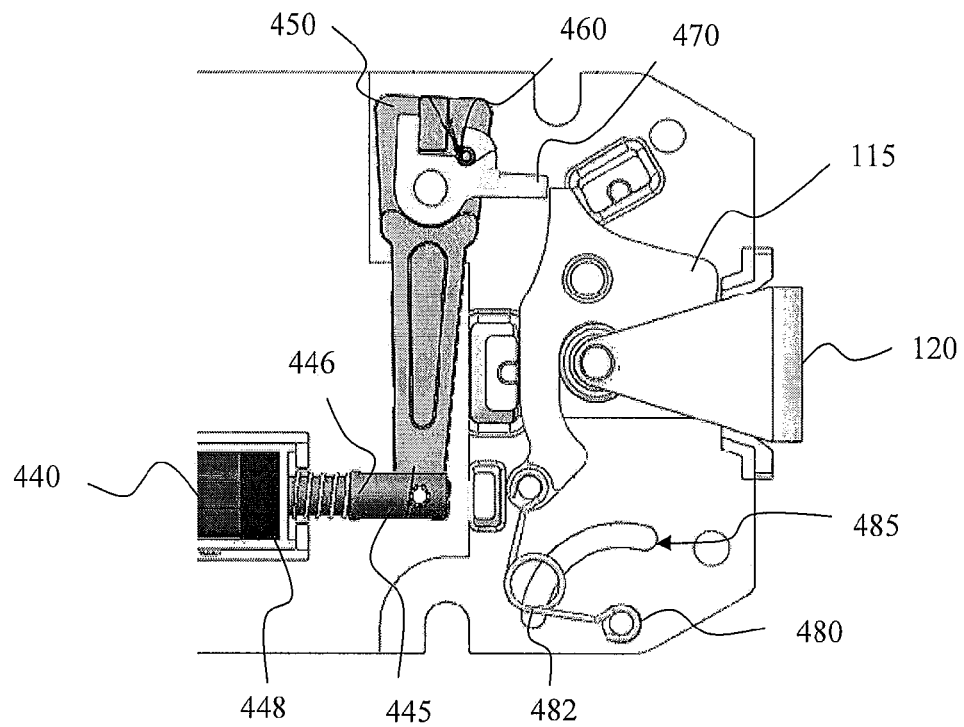
FIG. 9 depicts a plan view of an exemplary latch apparatus in which the latch hook is in the closed position and the solenoid is in the locked position according to one exemplary embodiment of the present disclosure.

FIG. 9 illustrates latch apparatus 110 with latch hook 115 in a closed position and solenoid plunger solenoid plunger 445, solenoid lever 450, and solenoid lever catch 470 in the locked position. Magnet 448 detent biases solenoid plunger 445 to the retracted and locked position such that no electrical power is required to maintain solenoid plunger 445, solenoid lever 450, and solenoid lever catch 470 in the locked position. As illustrated, solenoid lever catch 470 will impede the movement of latch hook 115 from a closed position to an open position, thus providing secure storage to an enclosure. By engaging latch hook 115 with strike 120, center coil 482 of detent spring 480 is forced from the open position of guide 485 to the closed position of guide 485. When center coil 482 of detent spring 480 is in the closed position of guide 485, detent spring 480 biases latch hook 115 to the closed position.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A latch apparatus for cooperating with a strike to provide secure storage to an enclosure associated therewith, comprising:
   an actuating device for selectively placing said latch apparatus in either of a locked state and an unlocked state thereof in response to a control signal;
   a latch hook movable between respective open and closed positions thereof relative to said strike;
   bi-stable latch hook detent biasing means for biasing said latch hook to either of said open position and said closed position thereof while said latch apparatus is in either of said locked state and said unlocked state thereof; and
   a biased actuating device catch, associated with said actuating device and interoperative with said latch hook, so that said latch hook is movable from said open position thereof to said closed position thereof while said latch apparatus is in either one of its locked and unlocked states;
   wherein said actuating device comprises an electrically operated solenoid with a bi-position movable plunger which moves to an opposite position thereof when said solenoid is actuated; and
   said latch apparatus further includes bi-stable solenoid biasing means associated with said solenoid so that said latch apparatus can be maintained in either of said locked state and said unlocked state thereof without having to continuously supply power to said latch apparatus, said bi-stable solenoid biasing means including a spring for biasing said solenoid plunger to said unlocked state of said latch apparatus, and including a magnet for biasing said solenoid plunger to said locked state of said latch apparatus.

2. A latch apparatus as in claim 1, wherein said latch apparatus further includes:
   an RF receiver for receiving said control signal from an associated user-controlled RF remote control signal device; and
   a battery-operated power supply for powering said electrically operated solenoid and for powering said RF receiver.

3. A latch apparatus as in claim 2, wherein said latch apparatus further includes a relatively flat profile housing for receipt of said latch apparatus in a drawer of an associated enclosure, said housing having a removable section for receipt of said battery-operated power supply to facilitate changing of batteries of said power supply.

4. A latch apparatus as in claim 3, wherein:
   said remote control signal device includes keypad means for input of an access code thereto transmitted with said control signal; and
   said latch apparatus further includes circuitry associated with said RF receiver for decoding said access code to decide whether to send said control signal to said actuating device.

5. A latch apparatus as in claim 2, wherein said latch apparatus further includes:
   a housing for receipt of said latch apparatus in an associated enclosure; and
   a circuit board received in said housing, said circuit board providing said RF receiver and providing a processor for controlling operation of said electrically operated solenoid in response to said control signal.

6. A latch apparatus as in claim 5, wherein an associated user-controlled RF remote control signal device transmits encoded control signal data, and said processor includes a database of access codes for processing such encoded control signal data.

7. A latch apparatus as in claim 1, wherein said latch apparatus includes a receiver for receiving said control signal from an associated user-controlled remote control signal device.

8. A latch apparatus as in claim 1, wherein:
   said latch apparatus further includes hardwired connections therewith, for receiving said control signal from a user-controlled source whereby access to an associated enclosure is controlled by a user, and for transfer of electrical power to said electrically operated solenoid.

9. A latch apparatus as in claim 1, wherein:
   said latch apparatus further includes a housing for receipt of said latch apparatus in an associated enclosure; and
   said bi-stable latch hook detent biasing means comprises a latch hook detent spring pivotably associated with said latch hook and having a center coil received in a curved guide formed by said housing, for providing bi-stable functionality of said bi-stable latch hook detent biasing means by movement of said spring center coil in said curved guide.

10. A battery-operated energy conserving electronic latch system for providing secure storage to an associated enclosure, comprising:
    a strike associated with an enclosure to be secured;
    an electrically operated solenoid for selectively placing said latch system in either of a locked state and an unlocked state thereof in response to a control signal;
    a latch hook movable between respective open and closed positions thereof relative to said strike;
    bi-stable latch hook detent biasing means for biasing said latch hook to either of said open position and said closed position thereof while said latch system is in either of said locked state and said unlocked state thereof;
    a biased actuating device catch, associated with said solenoid and interoperative with said latch hook, so that said latch hook is movable from said open position thereof to said closed position thereof while said latch system is in either one of its locked and unlocked states;
    an associated user-controlled remote control signal device for selectively transmitting said control signal;
    a receiver for receiving said control signal;
    a battery-operated power supply for powering said electrically operated solenoid and for powering said receiver; and
    bi-stable solenoid biasing means associated with said solenoid so that said latch system can be maintained in either of said locked state and said unlocked state thereof without having to continuously supply power to said solenoid;
    wherein said solenoid includes a bi-position movable plunger which moves to an opposite position thereof when said solenoid is actuated; and
    said bi-stable solenoid biasing means includes a spring for biasing said solenoid plunger to said unlocked state of said latch system, and includes a magnet for biasing said solenoid plunger to said locked state of said latch system.

11. A battery-operated energy conserving electronic latch system as in claim 10, wherein:
    said latch system further includes a housing for receipt of said solenoid, said latch hook, said bi-stable latch hook detent biasing means, said biased actuating device catch, said receiver, and said bi-stable solenoid biasing means; and said battery-operated power supply is removably attached to said housing.

12. A battery-operated energy conserving electronic latch system as in claim 11, wherein:
said housing has a relatively flat profile for receipt thereof in a drawer of an associated enclosure;
said remote control signal device comprises an RF transmitter with keypad means for user input of an access code thereto transmitted with said control signal;
said receiver comprises an RF receiver; and
said latch system further includes a circuit board received in said housing, said circuit board providing said RF receiver and providing a processor associated with said RF receiver for decoding said access code to decide whether to send said control signal to said electrically operated solenoid.

13. A battery-operated energy conserving electronic latch system as in claim 11, wherein said bi-stable latch hook detent biasing means comprises a latch hook detent spring pivotably associated with said latch hook and having a center coil received in a curved guide formed by said housing, for providing bi-stable functionality of said bi-stable latch hook detent biasing means by movement of said spring center coil in said curved guide.

14. Methodology for a battery-operated energy conserving electronic latch apparatus for cooperating with a strike to provide secure storage to an associated enclosure, comprising:
providing an electrically operated solenoid for selectively placing the latch apparatus in either of a locked state and an unlocked state thereof in response to a control signal;
providing a latch hook movable by a user between respective open and closed positions thereof relative to said strike;
biasing such latch hook so that it is only in either of its open position or its closed position regardless of whether the latch apparatus is in either its locked state or unlocked state;
providing a catch associated with the solenoid and interoperative with the latch hook such that the latch hook is movable from its open position to its closed position regardless of whether the latch apparatus is in its locked or unlocked state;
providing a battery-operated power supply associated with the latch apparatus for powering the electrically operated solenoid;
biasing the solenoid into either of the locked or unlocked state once such state is electrically selected by a control signal so that the latch apparatus can be maintained in either its locked state or its unlocked state without having to continuously supply power to the solenoid;
providing the solenoid with a bi-position movable plunger which moves to an opposite position thereof when the solenoid is actuated; and
providing a spring for biasing the solenoid plunger to the unlocked state of the latch apparatus, and includes a magnet for biasing the solenoid plunger to the locked state of the latch apparatus.

15. Methodology as in claim 14, further comprising:
providing a receiver, associated with the latch apparatus and powered by the battery-operated power supply, for receiving said control signal; and
selectively transmitting said control signal to such receiver for placing the latch apparatus in either such locked or unlocked state.

16. Methodology as in claim 14, further including providing the latch apparatus in a relatively flat profile housing received in a drawer of an associated enclosure.

* * * * *